Dec. 30, 1969   R. R. ROUGH   3,486,874
MOLTEN ADDITION MELTER FOR A FOREHEARTH
Filed June 8, 1966   3 Sheets-Sheet 1
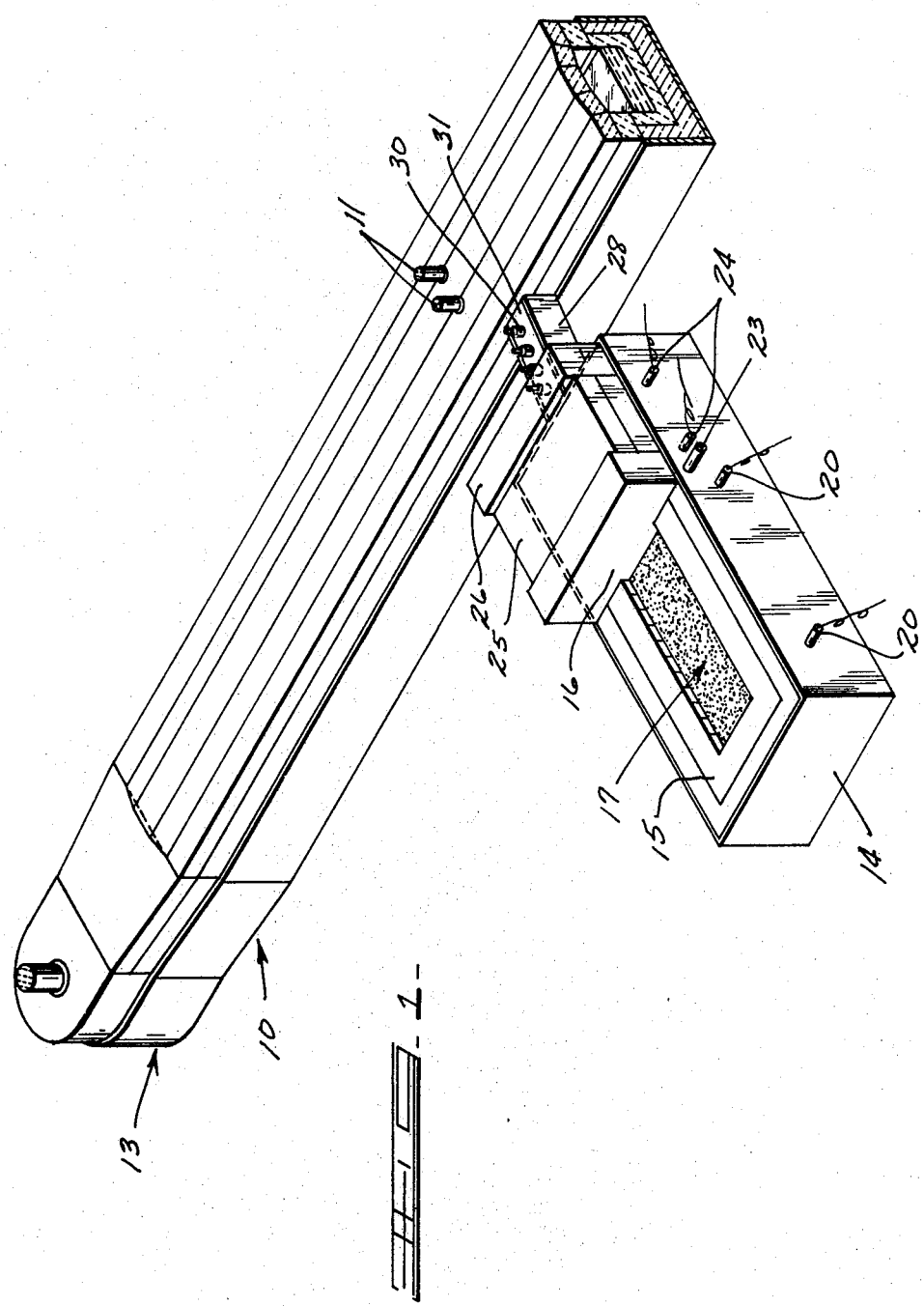
INVENTOR.
ROBERT R. ROUGH
BY
ATTORNEYS Dec. 30, 1969 R. R. ROUGH 3,486,874
MOLTEN ADDITION MELTER FOR A FOREHEARTH
Filed June 8, 1966 3 Sheets-Sheet 2
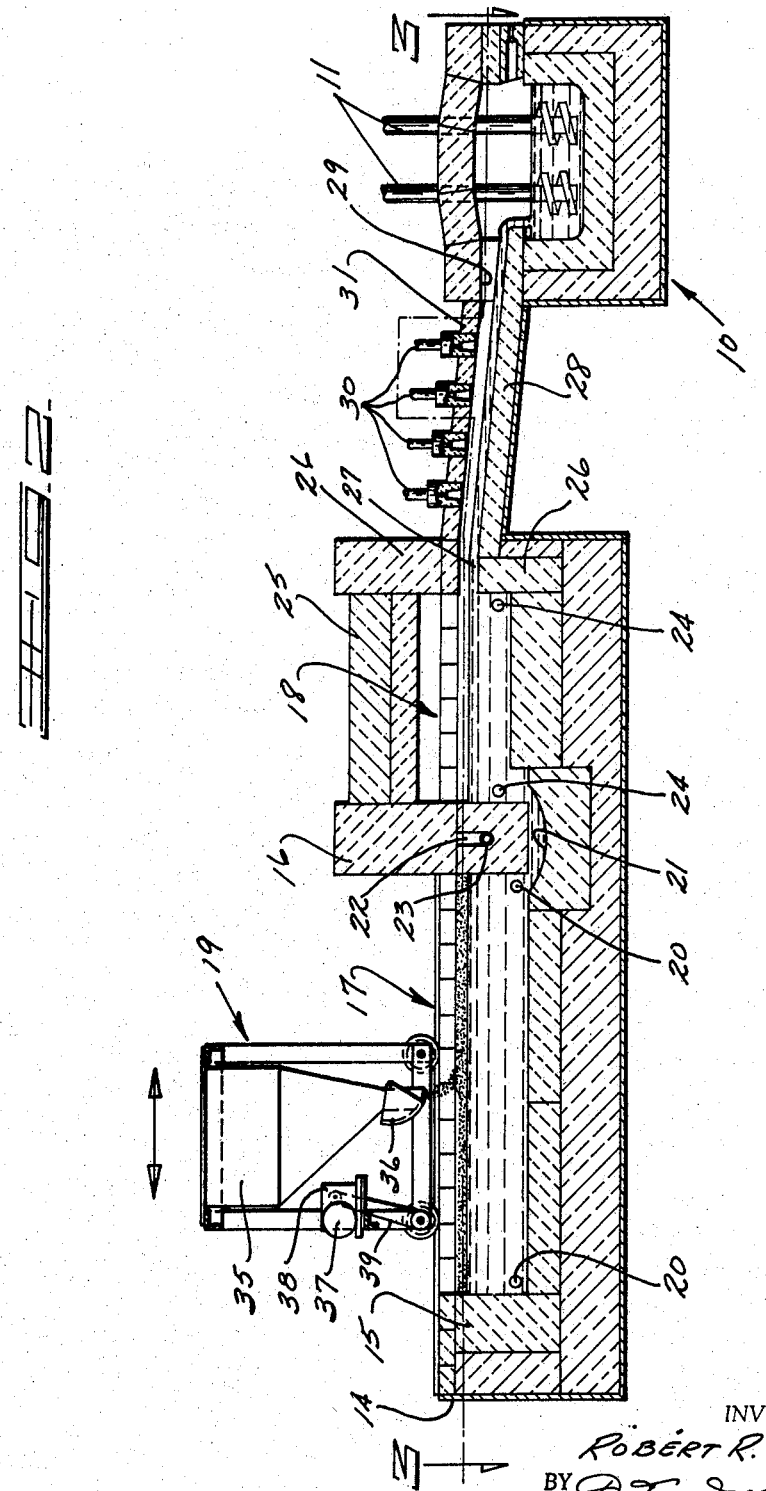

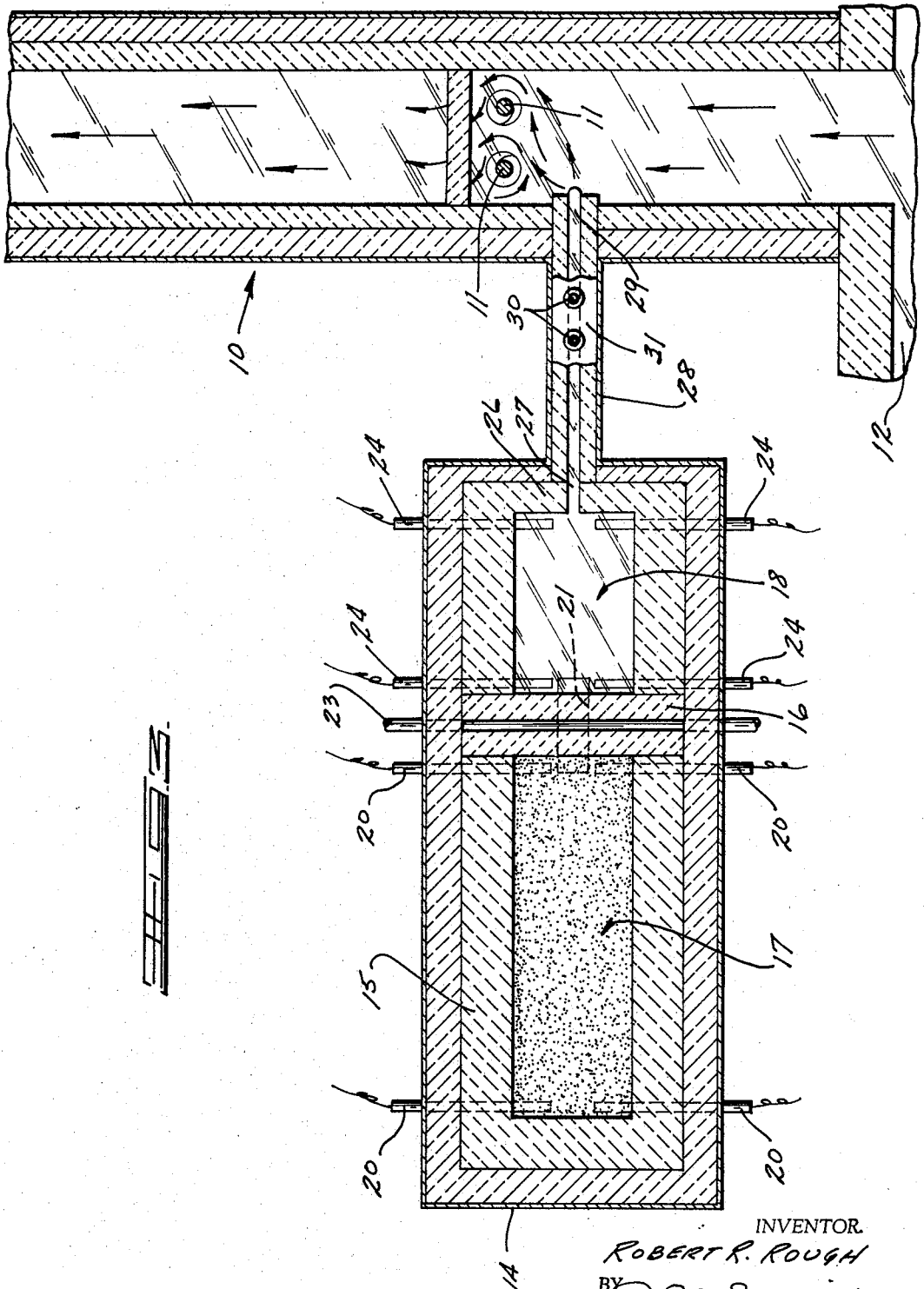

United States Patent Office 3,486,874
Patented Dec. 30, 1969

3,486,874
MOLTEN ADDITION MELTER FOR A FOREHEARTH
Robert R. Rough, Toledo, Ohio, assignor to Owens-Illinois, Inc., a corporation of Ohio
Filed June 8, 1966, Ser. No. 556,080
Int. Cl. C03b 5/00
U.S. Cl. 65—146                                                    1 Claim

ABSTRACT OF THE DISCLOSURE

The melting of highly enriched additive glass in a closed, two-compartment tank, wherein the larger volume melting compartment is totally covered with dry batch ingredients and the smaller fining compartment is refractory covered. The melting of the glass in both compartments is carried out by the use of electrodes extending into the glass to thus produce a highly colored or composition enriched additive glass free of seeds, blisters and other defect producing contaminants normally associated with gas overfiring type melters.

---

This invention relates to apparatus for melting additive glass for high color or composition concentration and the feeding of such additive in the molten state directly into a forehearth channel.

More particularly, this invention relates to apparatus for melting highly concentrated glass compositions without air entrapment and the addition of such concentrated additive in the molten state to a forehearth.

It has been the practice in the past when attempting to color relatively clear glass in a forehearth channel to add a small quantity of highly colored granular material, generally a glass, to the surface of the molten stream of clear glass. This prior practice would require that the granular material be melted by raising its temperature to the equivalent of the stream of glass and heating of the entire stream sufficiently high in temperature so as to facilitate mixing of the colorant and clear glass by various types of mechanical stirrers and bubblers. This prior practice is illustrated in my prior Patent No. 3,057,175 of Oct. 9, 1962.

In the operation of this prior process, it was necessary that the added coloring material be compatible with the glass to which it was added, such that there is no chemical reaction which would release gases to make bubbles in the glass or to form crystals or other solid residue which might detract from the appearance of the color of the modified glass.

Because the material added was cold in relation to the stream of glass flowing through the forehearth, a considerable amount of heat input was required to melt the additive.

Since the added material was essentially granular particles, there would be some gaseous entrapment during the melting as a result of the irregular shapes of the grains and minute cracks included in the particle of the additive. Usually, there would also be included minute amounts of abraded iron and organic contaminants in the additive particles which caused reactions with the molten glass to which they were added resulting in undesirable chemical reactions and bubble formation.

A further drawback of my prior process was the limitation with respect to the quantity of cold granular additive which could be added to the molten glass. Only limited quantities could be used because of the increase in formation of bubbles and also because of the difficulty of applying the melting heat in the limited time necessary to complete the melting.

A further limitation in the amount of cold additive which could be introduced into the molten glass was the fact that any increase in quantity would result in an increased entrapment of gases, thus producing the increase in bubble formation.

It was applicant's experience that 1/10 of an inch of additive would be relatively easy to add to the molten glass, while as much as 1 inch of added material would become extremely difficult to melt and mix with the clear glass stream.

The foregoing difficulties with the prior processes obviously limit the color intensity which can be satisfactorily produced.

Furthermore, there was also a limit with respect to the solubility of certain colorant agents which can be produced as additives by the usual fuel fired melters.

With the foregoing in view, it is an object of this invention to utilize an electric melter to produce an additive glass of higher color or composition difference than is possible by fuel fired additive melters.

It is an additional object of this invention to produce an additive which can be added molten and at a temperature equivalent to or above that of the flowing stream to which it is added to eliminate the need for a high fire or heat input to this zone.

It is an additional object of this invention to permit the molten additive to be added without introduction of seeds or other contaminants to the molten glass stream to be modified.

A still further object of this invention is the elimination of glass defects to permit higher degrees of modification of color or composition to be accomplished.

A still further object of this invention is to provide apparatus for melting additives and introducing the additives to the stream of glass to be modified which cannot be currently produced as cold additives.

It is an additional object of this invention to provide an electric melter utilizing non-reactive type electrodes.

Other and further objects will be apparent from the following description taken in conjunction with the annexed sheets of drawings, wherein:

FIG. 1 is a perspective view of the melter of the invention in association with a forehearth;

FIG. 2 is a vertical, sectional view, on an enlarged scale, taken along line 2—2 of FIG. 1; and FIG. 3 is a top plan view taken at line 3—3 of FIG. 2.

With specific reference to the drawings, the apparatus of the invention is disclosed in conjunction with a standard forehearth 10 incorporating the usual stirring mechanism 11. As is well known, the forehearth is an elongated flow channel for molten glass extending from a melter and refining chamber 12 to a conventional feeder mechanism 13.

As indicated by the above objects, the purpose of the method and apparatus of the invention is to provide a system for melting particulate material and introducing material in a molten state at a controllable temperature to the forehearth in advance of the stirring mechanism.

With the foregoing in mind, applicant provides a substantially rectangular metal structure 14 lined with the usual ceramic insulating material 15. The melter is divided by a wall 16 into a melting zone 17 and a fining zone 18. The melting zone 17 is open-topped and the material to be melted is supplied over the length and width of the upper top by a reciprocating batch feeding mechanism 19. The batch feeding mechanism is of the type in which a hopper 35, having a gate valve 36 at the bottom, is reciprocated back and forth by a motor 37, gear reduction 38 and belt drive 39 so as to provide a relatively even layer of material over the top of the surface of the molten material which is formed in the melter. In this manner a continuous supply of batch material is supplied to the melter. The glass itself, which is formed by the heating of the batch material, is heated electrically by electrodes 20. These electrodes are supplied from a 60 cycle AC source and the current flow through the glass will result in maintaining the glass therein in a molten state and provide sufficient heat to continuously melt the replenished blanket.

In order to ensure complete melting and to ensure that the molten material which is to be added to the forehearth is in a stable condition, the molten glass from the melting zone 17 flows beneath the dividing wall 16 through a channel 21 which extends into the fining zone 18.

It has been applicant's experience that it is advantageous to cool the wall 16 and with this in view, a generally horizontal opening 22 is provided through the wall 16 and a supply of cooling water may be supplied by a pipe 23 to the opening 22. In this manner the wall 16 may be maintained at a preselected lower temperature.

In order to ensure that the glass within the fining zone 18 is maintained at the desired elevated temperature, a second set of independently controlled electrodes 24 have their inner ends immersed in the glass in the zone 18 and by suitable current control, which may be effected through the interposition of a regulator with the source of current, the glass within the zone 18 is maintained at a controlled, constant temperature.

It is desirable also that zone 18 be covered so as to provide a better temperature control of the entire body of the glass within the zone 18. This cover is in the form of a ceramic block 25 supported above and overlying the zone 18.

Zone 18, at its forward wall 26 is provided with a narrow overflow channel 27 through which the molten glass will flow and a bridging channel 28 having a downwardly inclined orientation is connected to the overflow channel 27 at one end and at its lower end is connected to an opening 29 formed through the side wall of the forehearth.

It should be noted that the inclined connecting channel is formed of an insulating ceramic material and has its exit and extending a slight distance beyond the inner wall of the channel of the forehearth. In this manner the molten addition material is added to the stream of glass in the forehearth channel in a non-eroding manner.

As an additional control of the temperature of the addition, a series of burners 30 are provided opening into the upper wall 31 of the connecting bridging channel 28. Obviously, suitable thermocouples or other temperature sensing means may be provided whose output will operate regulators to control the amount of heat being produced by the burners 30. Likewise, suitable temperature control arrangements in the form of thermocouples or other sensing elements may be provided in both the melting zone 17 and the fining zone 18 with their utilization in the automatic control of the amount of current being fed to the electrodes.

As a specific example, the apparatus of the invention is constructed such that the melting chamber 17 is of about twice the length of the fining zone 18, with the normal depth of molten material in the melting chamber being six to 10 inches and the batch blanket, which is maintained on the surface of the glass in the melting zone 17, is between one and two inches.

With the particular apparatus shown and described, applicant has found that a considerable saving in heat is realized from the standpoint that it is not necessary to raise the heat of the glass flowing in the forehearth channel so as to melt frit or colorant materials when they are introduced to the channel in unmelted condition. With applicant's invention the additive material is in a molten state when it is introduced into the forehearth channel. Furthermore, by utilizing electric melting, compositions may be melted which cannot be maintained in the proper state of oxidation when fuel fire melters are used. The melter of the invention also has merit from the standpoint that compositions which could not be granulated by water quenching because of their solubility characteristics, may be melted in the present apparatus and added as molten material to the forehearth.

It should be recognized that by providing apparatus in which the connection between the melting and fining chambers is by an underflow channel, assures that incompletely melted glass in the melting chamber will not find its way into the fining chamber. Furthermore, by providing a fining chamber of approximately one-half the volume of the melting chamber, there will be sufficient time of residence in the fining chamber for the batch to become completely melted. The residence time in the fining chamber is sufficient to ensure that the glass is substantially seed and cord-free prior to its leaving the fining chamber.

As stated above, the depth of the melting chamber and fining chamber is rather shallow when compared with the depths of normal or conventional melting and fining chambers. The conventional melters have a depth of three to five feet, whereas in the present invention the melter and fining chambers have a depth of about six to ten inches. With the shallow depth of the melting and fining chambers, the maximum melting rate of batch for the molten glass, with respect to the temperature at the bottom of the molten glass at the refractory melter lining interface, is achieved.

From experience and through experimentation, it has been found that because of the high proportion of heat absorbed into the batch, as compared to the heat lost through the melter bottom refractories, the temperature produced under the batch is the lowest temperature experienced by the molten glass, while the temperature of the glass at the lower level in the molten glass will be the highest.

In conventional melters this thermal gradient from the top to bottom has been observed to be in the order of 50° F. per foot of depth. Since the batch is melted by the heat absorbed from the nearest glass of approximately six to ten inches depth, additional depth of molten glass results in higher temperatures against the tank walls and bottom than is necessary to obtain the desired batch melting rate. This higher temperature of glass at the interface with the refractory lining results in a condition of high wear rate, thus giving the tank a shorter life.

It has been applicant's experience that the shallow depth structure results in the greatest tank life for the melting rate selected. The melting rate of the batch is directly related to the glass temperature under the blanket. Thus, if it is desired to increase the melting rate of the batch, it is necessary to increase the glass temperature under the batch blanket.

Because of this shallow melter depth, there are some, although relatively few, partially melted batch particles which pass under the separating wall into the fining chamber or second melter. This so-called fining chamber perhaps is most correctly termed a second melter since it is used to complete the melting of batch particles from the first melter. The second melter or fining chamber can be operated at only as high a temperature as is necessary to complete melting and refining of the glass for the desired quality. Deeper melters have provided good melting, but have not provided the desired quality control over the entire melting output range, as is the case with the present invention utilizing a shallow two chamber melter.

While the present invention has been disclosed primarily with respect to the melting of molten additive glass which is intended to be added to a base glass, it should be kept in mind that the principles of the invention can be applied to melting any type of glass.

Other and further modifications may be resorted to within the spirit and scope of the appended claim.

I claim:

1. Apparatus for continuously producing a molten homogenous glass product including in combination a forehearth containing a flowing stream of molten glass, means extending into said forehearth for stirring the flowing glass therein, a melter tank positioned at one side of said forehearth, said tank containing molten additive, a vertical wall dividing said tank into a first open-topped chamber and a second closed chamber, said second chamber being substantially half the size of said first chamber, a glass batch feeder reciprocably mounted over the top of said first chamber, said feeder having a discharge opening extending the width of said chamber, means for reciprocating said feeder the full length of said first chamber, said dividing wall having a channel adjacent the bottom thereof through which the molten additive flows from said first chamber to said second chamber, a plurality of heating electrodes in each of said chambers, an overflow outlet in the end wall of said second chamber, a bridging flow channel connecting said overflow outlet to said forehearth and being inclined downwardly in the direction of said forehearth, said bridging channel extending beyond the inner wall of said forehearth upstream of said stirring means.

References Cited

UNITED STATES PATENTS

| | | | |
|---|---|---|---|
| 1,483,278 | 2/1924 | Carey | 65—335 XR |
| 1,828,217 | 10/1931 | Barker | 65—146 XR |
| 1,906,695 | 5/1933 | Lufkin | 65—335 |
| 2,293,948 | 8/1942 | Peyches | 65—347 XR |
| 2,294,373 | 9/1942 | Batchell | 65—121 XR |
| 2,397,852 | 4/1946 | Gentil | 65—335 XR |
| 2,955,384 | 10/1960 | Silverman | 65—146 |
| 3,343,935 | 9/1967 | Keefer et al. | 65—121 |

FRANK W. MIGA, Primary Examiner

U.S. Cl. X.R.

65—335, 337, 339, 346, 345, 121, 347